United States Patent
Leonard (10) Patent No.: US 10,273,023 B2
(45) Date of Patent: Apr. 30, 2019

(54) MODIFIED STRUCTURAL FRAME FOR STORING PROPULSION FUEL IN A CUBESAT

(71) Applicant: Matthew J Leonard, Bryan, TX (US)

(72) Inventor: Matthew J Leonard, Bryan, TX (US)

( * ) Notice: Subject to any disclaimer, the term of this patent is extended or adjusted under 35 U.S.C. 154(b) by 357 days.

(21) Appl. No.: 15/360,797

(22) Filed: Nov. 23, 2016

(65) Prior Publication Data

US 2018/0141683 A1    May 24, 2018

(51) Int. Cl.
*B64G 1/40* (2006.01)
*B64G 1/10* (2006.01)

(52) U.S. Cl.
CPC ............... *B64G 1/402* (2013.01); *B64G 1/10* (2013.01)

(58) Field of Classification Search
CPC . B64G 1/402; B64G 1/10; B64G 1/40; B64G 1/002
See application file for complete search history.

(56) References Cited

U.S. PATENT DOCUMENTS

| | | | | |
|---|---|---|---|---|
| 6,068,010 A | * | 5/2000 | Reinicke | B64G 1/26 137/1 |
| 2015/0001344 A1 | * | 1/2015 | Deel | B64G 1/002 244/158.5 |
| 2016/0200457 A1 | * | 7/2016 | Droppers | B64G 1/402 244/171.1 |

* cited by examiner

*Primary Examiner* — Valentina Xavier (57) ABSTRACT

A miniature satellite that uses a modified structural frame in order to store and disperse propulsion fuel efficiently. The modified structural frame includes a plurality of structural members. Each of the plurality of structural members includes a tubular body, a first endcap, a second endcap, an outlet port, and an inlet port. The first endcap and the second endcap are oppositely positioned within the tubular body. The first endcap and the second endcap are each perimetrically connected to the tubular body in order to delineate a fuel storage volume. The inlet port is positioned in between the first endcap and the second endcap and is mechanically integrated into the tubular body. The outlet port disperses propulsion fuel and is also mechanically integrated into the tubular body. The inlet port is in fluid communication with the outlet port through the tubular body. Additionally, the structural members are mounted amongst each other.

11 Claims, 8 Drawing Sheets

SECTION A-A

DETAIL B

MODIFIED STRUCTURAL FRAME FOR STORING PROPULSION FUEL IN A CUBESAT

FIELD OF THE INVENTION

The present invention relates generally to satellites, in particular to pico-class satellites. More specifically, the present invention is an alternative truss design for a miniature satellite called a CubeSat. In addition to acting as the support frame for the miniature satellite, each truss member of the truss design also stores and disperses propulsion fuel.

BACKGROUND OF THE INVENTION

A CubeSat is a type of miniature satellite that is utilized for space research and often deployed from the international space station or launched as secondary payload on a rocket. Generally, a CubeSat is made of multiples of 10×10×11.35 centimeter cubic units and have a mass of no more than 1.33 kilograms per unit. Compared to traditional satellites, launching a CubeSat into orbit is significantly cheaper. Additionally, CubeSats use standardized hardware that is readily available to the general public and are relatively easy and cheap to build. As a result, CubeSats have become the industry standard microsatellite. Regardless of their size, CubeSats may be used for a variety of different missions. CubeSats may be used to capture images from space, send/redirect radio communications, perform atmospheric research, and perform other similar tasks. One of the main capabilities necessary for a CubeSat is maneuverability control. This is traditionally achieved through the use of a gas jet device. The gas jet device allows for performing latitude and longitude orbital corrections as well as controlling the satellite's attitude. As a result, a portion of the internal space within the CubeSat must be dedicated to a propulsion fuel storage. Due to the compact size and the deploying cost, a CubeSat is generally required to meet the aforementioned dimensions. Resultantly, the storage volume of the CubeSat becomes limited especially when a propulsion fuel storage is necessary.

It is therefore an objective of the present invention to provide an alternative CubeSat truss design that includes an integrated propulsion stowage in order to create additional storage space within the CubeSat. The present invention shifts propulsion fuel storage from the internal space of the CubeSat into the framework of the CubeSat. More specifically, the present invention utilizes a multitude of hollow structural members to make up the frame in order to allow for propulsion fuel to be stored within each of the hollow structural members.

DETAIL DESCRIPTIONS OF THE INVENTION

All illustrations of the drawings are for the purpose of describing selected versions of the present invention and are not intended to limit the scope of the present invention.

The present invention generally relates to alternative designs for a microsatellite. More specifically, the present invention is a modified structural frame for a satellite that is capable of storing propulsion fuel. The present invention is configured for a specific type of microsatellites known as a CubeSat 1. Although, it is understood that the present invention may be altered and configured for alternative satellites and type of satellites. The CubeSat 1 is a miniaturized satellite that comprises a multitude of 10×10×11.35 centimeter cubic units and has a mass of no more than 1.33 kilograms per unit. Traditionally, the structural frame of the CubeSat 1 is a plurality of pillars that is mainly intended to support and house the internal components of the CubeSat 1. The present invention modifies the structural frame in order to add a secondary purpose for the structural frame, to act as a gas tank. The present invention allows for each of the pillars of the structural frame to store and disperse the propulsion fuel. This eliminates the need for traditional gas tanks within the CubeSat 1, which in turn increases the available space with the CubeSat 1.

Figure 1:
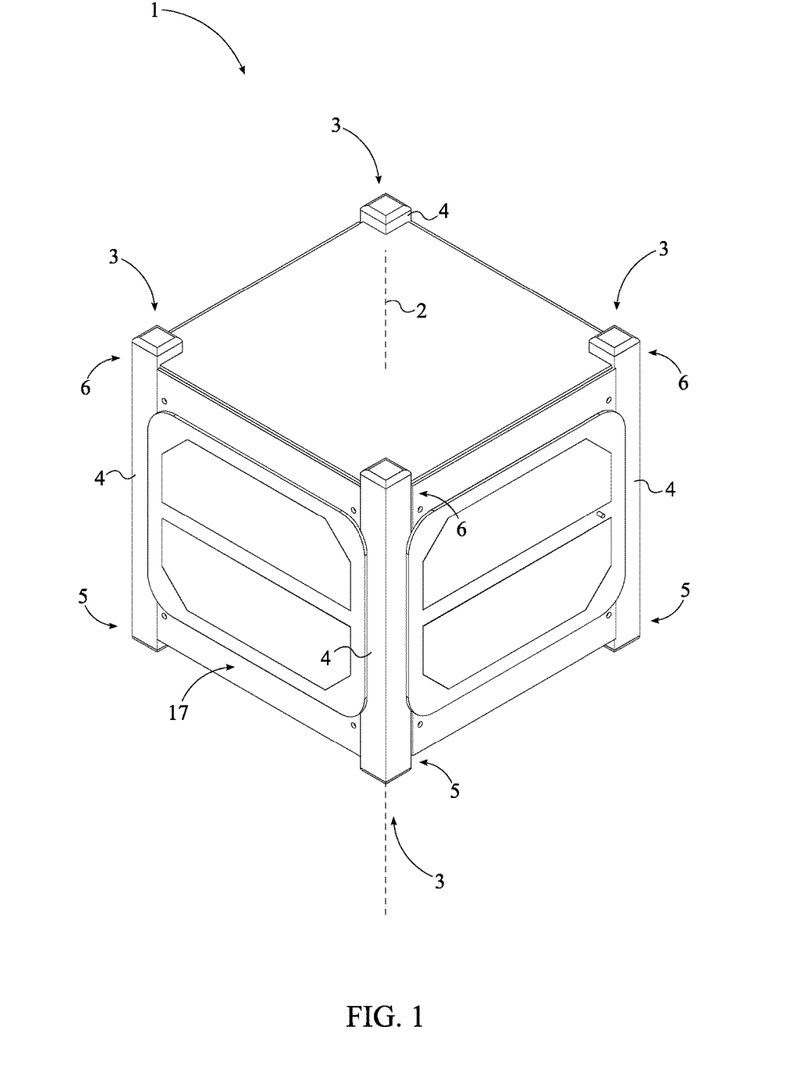
FIG. 1 is a perspective view of the present invention.
Figure 2:
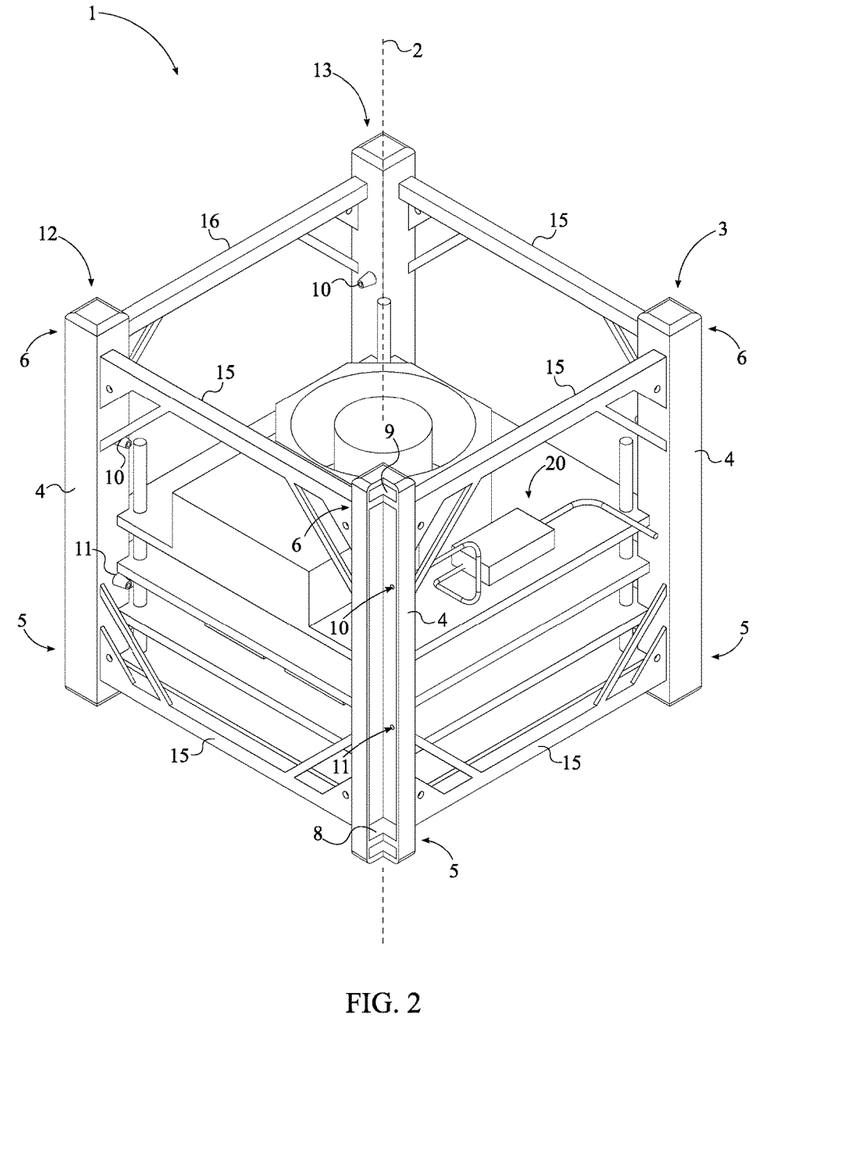
FIG. 2 is a perspective view of the present invention with the specific enclosure removed.
Figure 7:
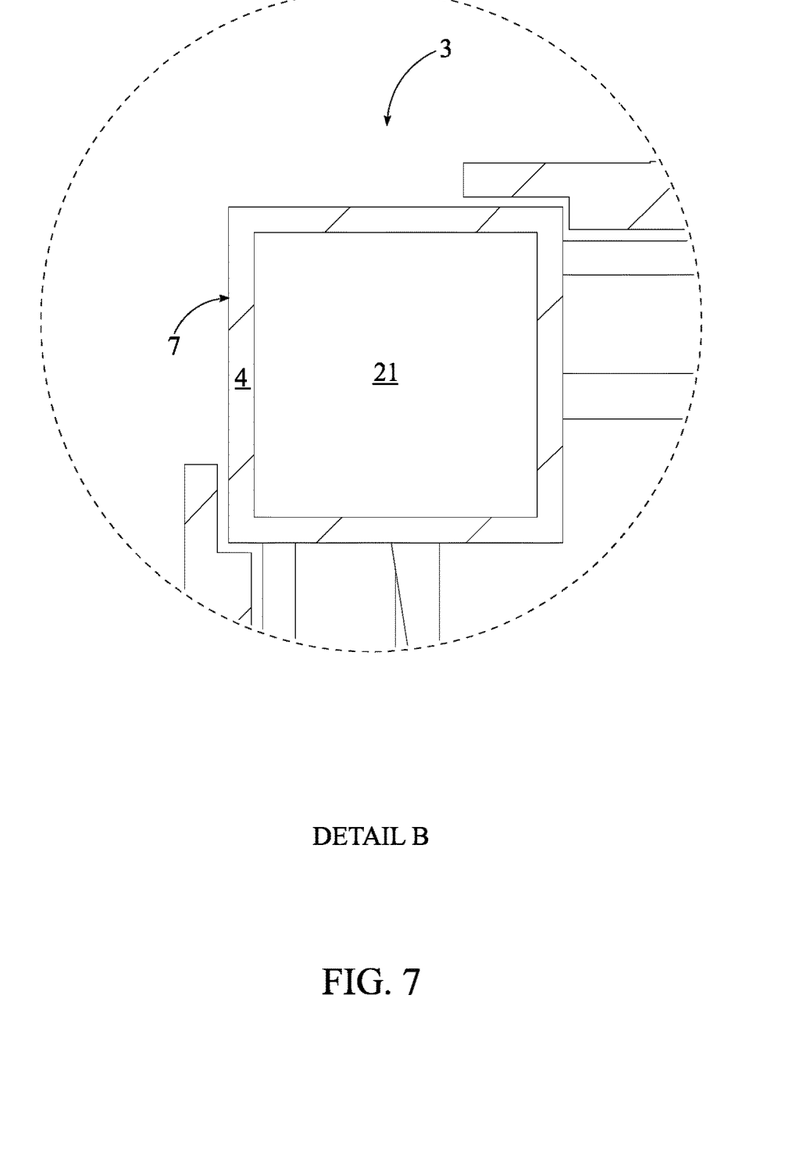
FIG. 7 is a detailed view of the present invention taken about the circle B in FIG. 4.

Referring to FIG. 1 and FIG. 2, the present invention comprises a plurality of structural members 3 and a plurality of crossbars 15. The plurality of structural members 3 is mounted amongst each other in order to makes up the structural frame of the CubeSat 1. The plurality of structural members 3 houses and supports various components necessary for the operations and capabilities of the CubeSat 1. Additionally, each of the plurality of structural members 3 is capable of storing and dispersing the propulsion fuel. Each of the plurality of structural members 3 comprises a tubular body 4, a first endcap 8, a second endcap 9, an outlet port 10, and an inlet port 11. The tubular body 4 is an elongated pillar which acts as the structural support element, preferably composed of aluminum or other comparable material. Referring to FIG. 7, a cross section 7 of the tubular body 4 is preferably a rectangular shape, although alternative shapes may also be used. The first endcap 8, the second endcap 9, and the tubular body 4 create a gas tank that receives and stores propulsion fuel. In general, the present invention uses each of the plurality of structural members 3 as a gas tank.

Figure 8:
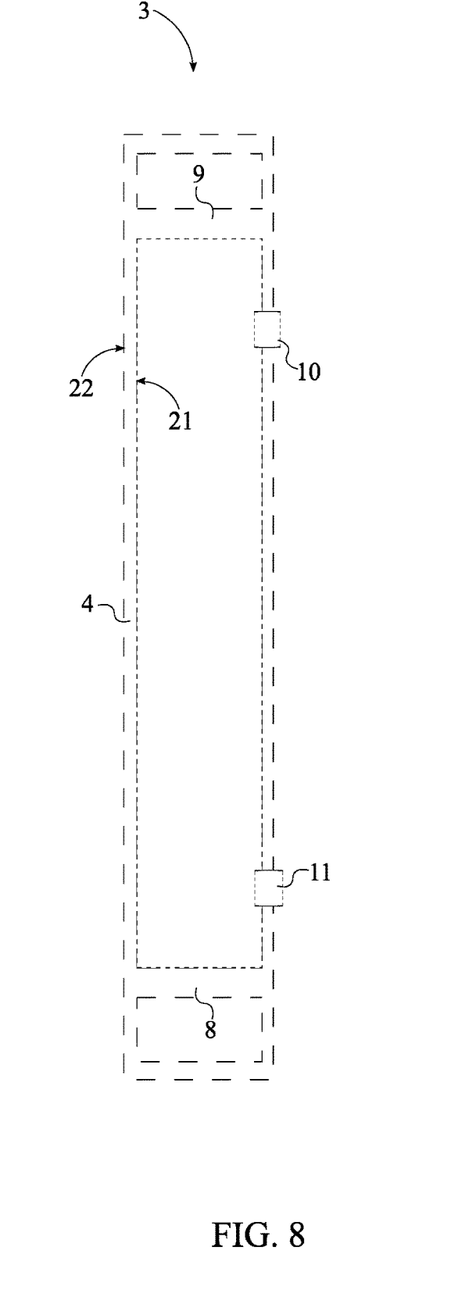
FIG. 8 is a schematic view of one of the plurality of structural members.

The first endcap 8 and the second endcap 9 are sized and shaped complimentary to the internal space/surface of the tubular body 4. The first endcap 8 and the second endcap 9 are positioned within the tubular body 4, offset from each other across the tubular body 4. More specifically, the first endcap 8 is perimetrically connected to the tubular body 4, adjacent to a proximal end 5 of the tubular body 4. It is preferred that the first endcap 8 is marginally offset from the proximal end 5 of the tubular body 4. This is to accommodate components such as a kill switch, separation springs, and other similar components. The second endcap 9 is perimetrically connected to the tubular body 4, adjacent to a distal end 6 of the tubular body 4. It is preferred that the second endcap 9 is marginally offset from the distal end 6 of the tubular body 4. This is to accommodate components such as a kill switch, separation springs, and other similar components. As a result, a fuel storage volume 21 is delineated by the tubular body 4, the first endcap 8, and the second endcap 9. Referring to FIG. 8, in the preferred embodiment of the present invention, a ratio between the fuel storage volume 21 and an overall volume 22 of the tubular body 4 being 3 to 4 to ensure adequate structural integrity.

The inlet port 11 is mechanically integrated into the tubular body 4 and allows for the propulsion fuel to be pumped into the fuel storage volume 21. The outlet port 10 is positioned in between the first endcap 8 and the second endcap 9 and controls the flow of the propulsion fuel from the fuel storage volume 21 to components of the CubeSat 1, in particular to a thruster of the CubeSat 1. More specifically, the outlet port 10 is mechanically integrated into the tubular body 4. As a result, the inlet port 11 is in fluid communication with the outlet port 10 through the tubular body 4, thus allowing for propulsion fuel to be pumped into and out of the fuel storage volume 21.

Figure 3:
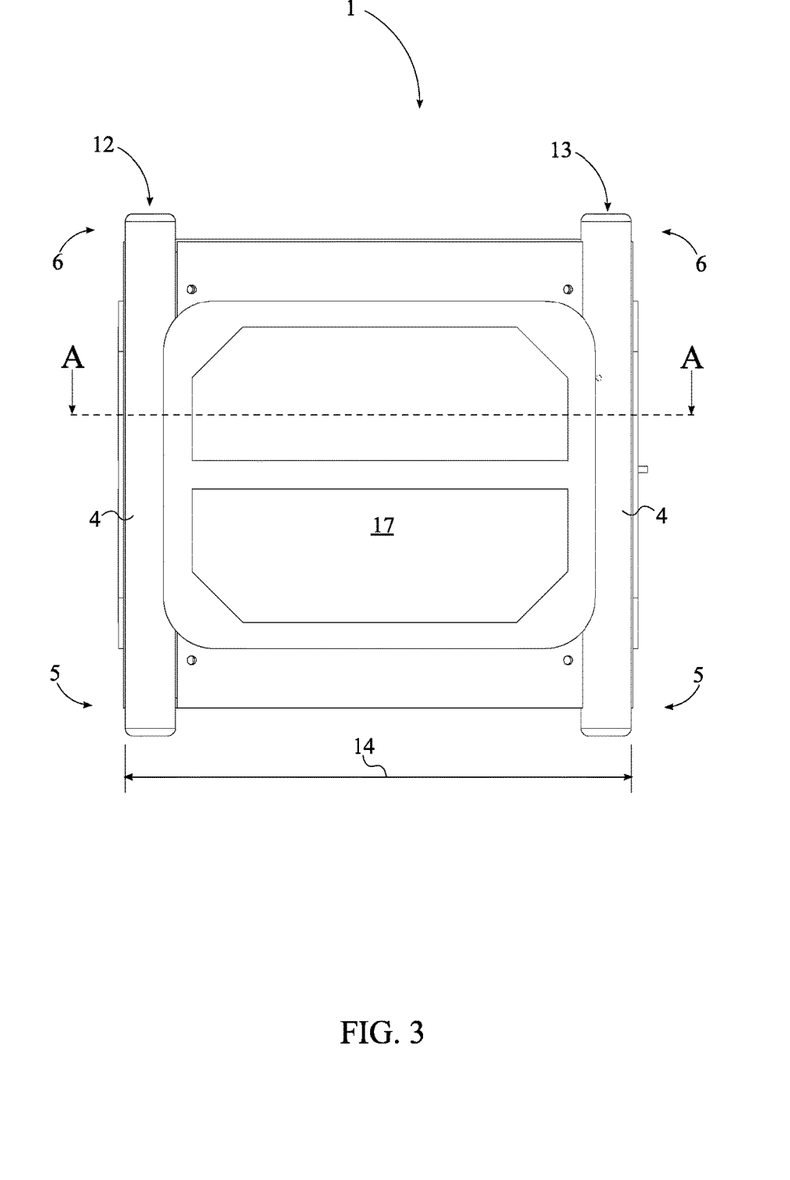
FIG. 3 is a side view of the present invention.
Figure 4:
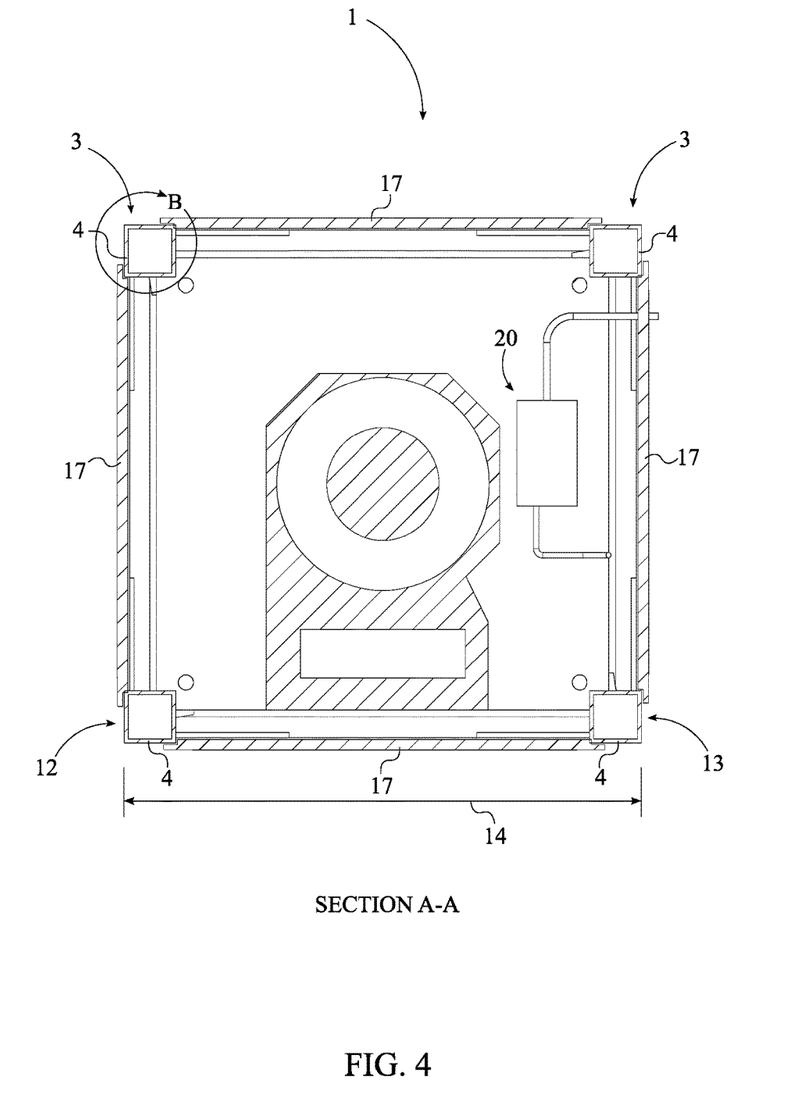
FIG. 4 is a cross sectional view of the present invention taken about line A-A in FIG. 3.

Referring to FIG. 2 and FIG. 3, the plurality of structural members 3 comprises an arbitrary member 12 and an adjacent member 13. The arbitrary member 12 and the adjacent member 13 can be any two members amongst the plurality of structural members 3 that are located next to each other. It is preferred that the arbitrary member 12 is positioned parallel and offset to the adjacent member 13. This configuration positions the plurality of structural members 3 parallel amongst each other. The plurality of crossbars 15 mounts the plurality of structural members 3 amongst each other and provides the horizontal support for the CubeSat 1. More specifically, an at least one specific crossbar 16 from the plurality of crossbars 15 is positioned in between the arbitrary member 12 and the adjacent member 13. On one end, the specific crossbar 16 is adjacently and perpendicularly connected to the tubular body 4 of the arbitrary member 12. On the other end, the specific crossbar 16 is adjacently and perpendicularly connected to the tubular body 4 of the adjacent member 13. In other words, an at least one crossbar from the plurality of crossbars 15 connects two members from the plurality of structural members 3. Each of the crossbars is preferably a rectangular extrusion composed of material similar to the material used for the tubular body 4. Due to compact size and the deploying cost of microsatellites, the structural frame of the CubeSat 1 is required to engage with the industry standard launching rails. In accordance with these restrictions, it is preferred that the plurality of crossbars 15 and the plurality of structural members 3 are sized and positioned such that a distance 14 between the arbitrary member 12 and the adjacent member 13 is ten centimeters as seen in FIG. 4. In addition, the plurality of structural members 3 preferably includes four members. Furthermore, the plurality of structural members 3 is radially and equally distributed about a central axis 2 of the CubeSat 1 into a square shape, wherein each of the plurality of structural members 3 is located at a corner of the square.

Figure 5:
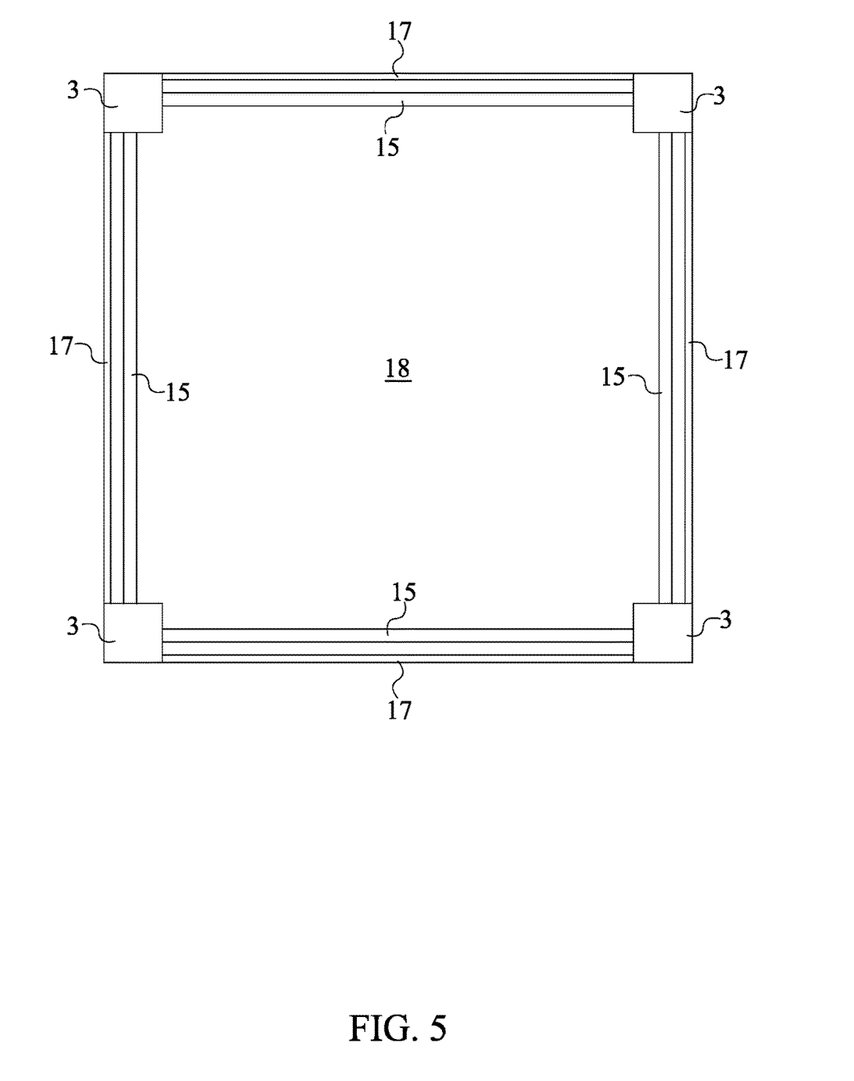
FIG. 5 is a schematic view of the present invention.

Referring to FIG. 5, a specific enclosure 17 of the CubeSat 1 is used to shield and protect internal components of the CubeSat 1. The specific enclosure 17 comprises a multitude of panels attached to the plurality of structural members 3. More specifically, the specific enclosure 17 is peripherally mounted to the plurality of structural members 3 and the plurality of crossbars 15. As a result, a storage volume 18 is delineated by the specific enclosure 17, the plurality of structural members 3, and the plurality crossbars 15. The storage volume 18 houses the internal components of the CubeSat 1. Examples of internal components include, but are not limited to, a camera, a communication system, an electrical power system, a gyroscope, and an accelerometer.

The inlet port 11 and outlet port 10 allow for fluid communication between the fuel storage volume 21 and external component/entities. It is preferred that the outlet port 10 and the inlet port 11 are each oriented towards the storage volume 18 for easy access for internal components of the CubeSat 1. A variety of mechanisms/devices may be used for the inlet port 11 and the outlet port 10 in order to compliment the capabilities and internal components of the CubeSat 1. In one embodiment of the present invention, the inlet port 11 and the outlet port 10 are each a passive port. Through the use of a passive port, a channel that laterally traverses through the tubular body 4 is created, thus allowing the propulsion fuel to flow in or out of the fuel storage volume 21. The passive port may be implemented in a variety of means including, but not limited to, a piece of piping, a hole, or other similar mechanisms. Passive ports retain the standardized characteristics of the CubeSat 1 as they allow for a wide variety of piping and or valve combinations to attach to the passive port. In another embodiment of the present invention, the inlet port 11 and the outlet port 10 are each an active port. Through the use of an active port, a monitored channel that laterally traverses through the tubular body 4 is created, thus allowing the propulsion fuel to flow in and out of the fuel storage volume 21. An active port includes a means for controlling and managing the flow of the propulsion fluid across the inlet port 11 and the outlet port 10. A variety of mechanisms may be included in the active port in order to manage the flow of a fluid including, but not limited to, a pneumatic valve, an electric valve, and other similar devices.

Figure 6:
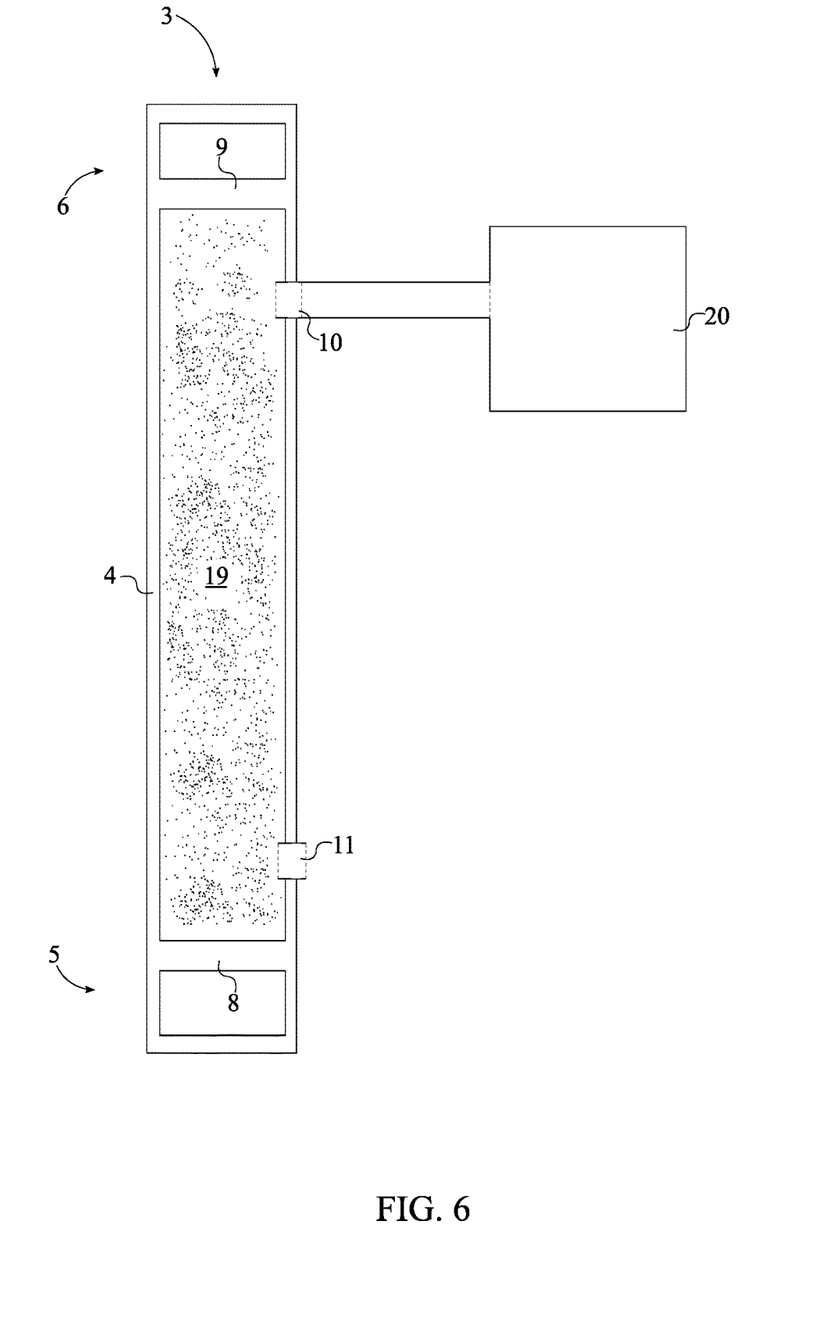
FIG. 6 is a fluid schematic view of the present invention.

The present invention allows for the storage of propulsion fuel. Type of propulsion fuel includes, but is not limited to, Zenon, Nitrogen, and other inert gasses. Referring to FIG. 6, the present invention allows for the storage of a volume of propulsion fuel 19. More specifically, the volume of propulsion fuel 19 is stored within the fuel storage volume 21 of the arbitrary member 12. Generally, the propulsion fuel is used to power an at least one cold gas thruster 20. The cold gas thruster 20 is used for performing latitude and longitude orbital corrections as well as controlling the attitude of the CubeSat 1. The cold gas thruster 20 is attached to the outlet port 10 of the arbitrary member 12 and, resultantly, is in fluid communication with the fuel storage volume 21 of the arbitrary member 12 through the outlet port 10 of the arbitrary member 12. In its simplest form, the cold gas thruster 20 comprises a nozzle, a valve, and associated plumbing. The nozzle disperses the propulsion fuel in a specific direction. The valve controls the flow rate of the propulsion fuel. The plumbing connects the valve and the nozzle to the fuel storage volume 21 of the arbitrary member 12.

Although the invention has been explained in relation to its preferred embodiment, it is to be understood that many other possible modifications and variations can be made without departing from the spirit and scope of the invention as hereinafter claimed.

What is claimed is:
1. A modified structural frame for storing propulsion fuel within a CubeSat comprises:
   a plurality of structural members;
   each of the plurality of structural members comprises a tubular body, a first endcap, a second endcap, an outlet port, and an inlet port;
   the first endcap and the second endcap being oppositely positioned within the tubular body;
   the first endcap being perimetrically connected to the tubular body, adjacent to a proximal end of the tubular body;

the second endcap being perimetrically connected to the tubular body, adjacent to a distal end of the tubular body;

the outlet port being positioned in between the first endcap and the second endcap;

the outlet port being mechanically integrated into the tubular body;

the inlet port being mechanically integrated into the tubular body;

the inlet port being in fluid communication with the outlet port through the tubular body; and the plurality of structural members being mounted amongst each other.

2. The modified structural frame for storing propulsion fuel within a CubeSat as claimed in claim 1 comprises:

a plurality of crossbars;

the plurality of structural members being mounted amongst each other by the plurality of crossbars;

the plurality of structural members comprises an arbitrary member and an adjacent member;

the arbitrary member being positioned parallel and offset to the adjacent member;

an at least one specific crossbar from the plurality of crossbars being positioned in between the arbitrary member and the adjacent member;

the specific crossbar being adjacently and perpendicularly connected to the tubular body of the arbitrary member; and the specific crossbar being adjacently and perpendicularly connected to the tubular body of the adjacent member.

3. The modified structural frame for storing propulsion fuel within a CubeSat as claimed in claim 2, wherein a distance between the arbitrary member and the adjacent member being ten centimeters.

4. The modified structural frame for storing propulsion fuel within a CubeSat as claimed in claim 1 comprises:

an enclosure of the CubeSat;

the enclosure being peripherally mounted to the plurality of structural members and to a plurality of crossbars;

a storage volume being delineated by the enclosure, the plurality of structural members, and the plurality of crossbars;

the outlet port being oriented towards the storage volume; and the inlet port being oriented towards the storage volume.

5. The modified structural frame for storing propulsion fuel within a CubeSat as claimed in claim 1 comprises:

the plurality of structural members being oriented parallel amongst each other; and the plurality of structural members being radially and equally distributed about a central axis of the CubeSat.

6. The modified structural frame for storing propulsion fuel within a CubeSat as claimed in claim 1 comprises:

a fuel storage volume being delineated by the tubular body, the first endcap, and the second endcap; and a ratio between the fuel storage volume and an overall volume of the tubular body being 3 to 4.

7. The modified structural frame for storing propulsion fuel within a CubeSat as claimed in claim 1 comprises:

a volume of propulsion fuel; and the volume of propulsion fuel being stored within a fuel storage volume of an arbitrary member from the plurality of structural members.

8. The modified structural frame for storing propulsion fuel within a CubeSat as claimed in claim 1 comprises:

an at least one cold gas thruster;

the cold gas thruster being attached to the outlet port of an arbitrary member from the plurality of structural members; and the cold gas thruster being in fluid communication with a fuel storage volume of the arbitrary member through the outlet port of the arbitrary member.

9. The modified structural frame for storing propulsion fuel within a CubeSat as claimed in claim 1, wherein a cross section of the tubular body is a rectangular shape.

10. The modified structural frame for storing propulsion fuel within a CubeSat as claimed in claim 1, wherein the inlet port and the outlet port are each a passive port.

11. The modified structural frame for storing propulsion fuel within a CubeSat as claimed in claim 1, wherein the inlet port and the outlet port are each an active port.

* * * * *